(12) United States Patent
Lane

(10) Patent No.: US 8,985,377 B2
(45) Date of Patent: Mar. 24, 2015

(54) BASKET ASSEMBLY FOR BEVERAGE BOTTLE

(75) Inventor: Marvin Lane, Wheeling, IL (US)

(73) Assignee: Thermos L.L.C., Schaumburg, IL (US)

( * ) Notice: Subject to any disclaimer, the term of this patent is extended or adjusted under 35 U.S.C. 154(b) by 0 days.

(21) Appl. No.: 13/397,362

(22) Filed: Feb. 15, 2012

(65) Prior Publication Data

US 2013/0206717 A1   Aug. 15, 2013

(51) Int. Cl.
*B65D 1/24* (2006.01)

(52) U.S. Cl.
USPC .................................. 220/521; 206/5; 99/279

(58) Field of Classification Search
USPC ........ 220/521, 803, 804; 206/0.5; 426/83, 84, 426/78, 79, 77; 99/279, 317, 322
See application file for complete search history.

(56) References Cited

U.S. PATENT DOCUMENTS

| | | | | |
|---|---|---|---|---|
| 523,344 | A | * | 7/1894 | Hancock .......................... 99/322 |
| 1,904,091 | A | * | 4/1933 | Shoop ............................ 220/803 |
| 2,914,207 | A | * | 11/1959 | Moore .......................... 215/270 |
| 5,738,786 | A | * | 4/1998 | Winnington-Ingram ..... 210/474 |
| 5,947,320 | A | * | 9/1999 | Bordner et al. ............... 220/321 |
| 5,984,141 | A | | 11/1999 | Gibler |
| 6,273,306 | B1 | | 8/2001 | Takagawa |
| 6,405,638 | B1 | * | 6/2002 | Chen ............................... 99/318 |
| 6,644,471 | B1 | * | 11/2003 | Anderson ...................... 206/222 |
| 7,464,637 | B1 | * | 12/2008 | Lin ................................. 99/322 |
| 2003/0213709 | A1 | * | 11/2003 | Gibler et al. .................. 206/219 |
| 2011/0056386 | A1 | * | 3/2011 | Taketani ......................... 99/317 |
| 2011/0290824 | A1 | * | 12/2011 | Smith et al. ................... 222/135 |

FOREIGN PATENT DOCUMENTS

| | | |
|---|---|---|
| DE | 298 20 698 U1 | 2/1999 |
| DE | 201 18 188 U1 | 2/2002 |
| JP | 2751876 B2 | 2/1998 |

OTHER PUBLICATIONS

Korean Patent Application No. 10-2013-0016044; Notice of Preliminary Rejection mailed Apr. 21, 2014; translation (6 pages).

* cited by examiner

*Primary Examiner* — Jeffrey Allen
(74) *Attorney, Agent, or Firm* — Polsinelli PC

(57) ABSTRACT

A basket assembly for removably coupling to a lid of a beverage bottle includes a basket body defining a chamber. One or more first openings are defined through the basket body and one or more second openings are defined through the basket body to provide fluid communication between the chamber and an interior volume of the beverage bottle body with the lid coupled to the beverage bottle body. A basket lid is coupled to the basket body. One or more third openings are defined through the basket lid and aligned with the one or more second openings to provide fluid communication between the interior volume of the beverage bottle body and a passage formed through the beverage bottle lid. A lid assembly including the basket assembly and a bottle including the lid assembly is also disclosed.

17 Claims, 11 Drawing Sheets

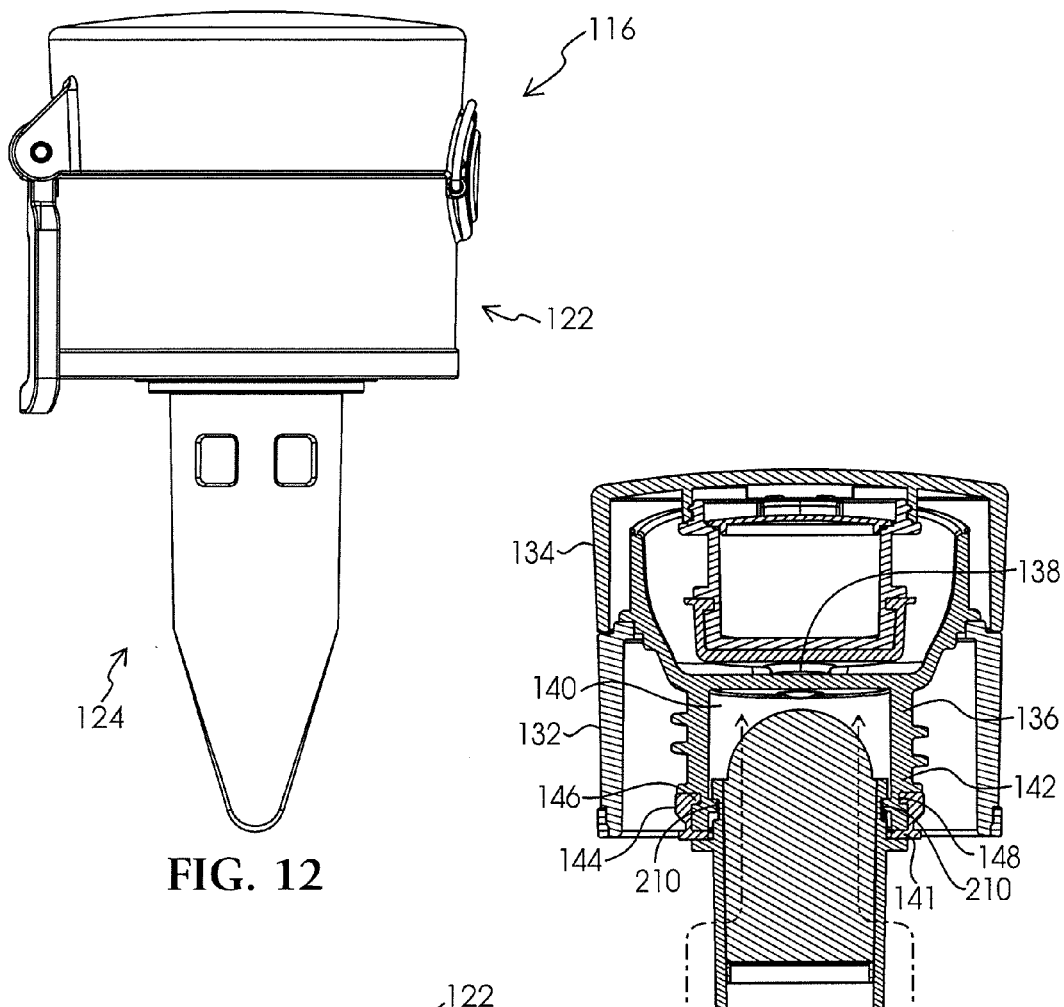
FIG. 12
FIG. 13
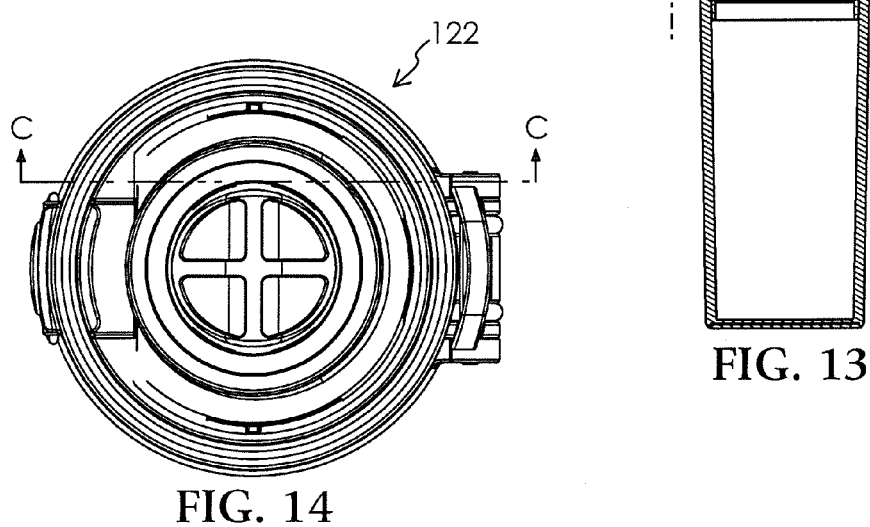
FIG. 14

US 8,985,377 B2

BASKET ASSEMBLY FOR BEVERAGE BOTTLE

BACKGROUND

The subject matter disclosed herein relates generally to a beverage bottle and, more particularly, to a basket assembly that is removably coupled to a lid of the beverage bottle.

Personal beverage bottles are becoming ever more popular and have moved beyond the common beverage bottle packed with a school lunch or in a lunch box. Gyms are filled with members exercising, and many members bring their own beverage bottles for hydration. Hikers, bikers, walkers, commuters, tourists and many others carry beverage bottles as they go on their way. Some conventional beverage bottles are configured to brew tea. These conventional beverage bottles require a first lid for infusing the tea and a second lid to replace the first lid when the tea is finished brewing to allow the user to drink the tea contained within the beverage bottle.

SUMMARY

In one aspect, a basket assembly is configured to removably couple to a lid of a beverage bottle. The beverage bottle has a body defining an interior volume. The basket assembly includes a basket body defining a chamber. One or more first openings are defined through the basket body to provide fluid communication between the chamber and the interior volume of the beverage bottle body with the lid coupled to the beverage bottle body, and one or more second openings are defined through the basket body to provide fluid communication between the chamber and the interior volume. A basket lid is coupled to the basket body. One or more third openings are defined through the basket lid and aligned with the one or more second openings to provide fluid communication between the interior volume of the beverage bottle body and a passage formed through the beverage bottle lid.

In another aspect, a lid assembly for a beverage bottle includes a beverage bottle lid configured to removably couple to a beverage bottle body that defines an interior volume. The beverage bottle lid includes a drink spout that defines a passage. A basket assembly is removably coupled to the beverage bottle lid. The basket assembly includes a basket body that defines a chamber. One or more first openings are defined through the basket body to provide fluid communication between the chamber and the interior volume of the beverage bottle body, and one or more second openings are defined through the basket body to provide fluid communication between the chamber and the interior volume. A basket lid is coupled to the basket body. One or more third openings are defined through the basket lid and aligned with the one or more second openings to provide fluid communication between the interior volume of the beverage bottle body and the passage.

In yet another aspect, a beverage bottle includes a beverage bottle body that defines an interior volume. A beverage bottle lid is configured to removably couple to the beverage bottle body. The beverage bottle lid includes a drink spout that defines a passage. A basket assembly is removably coupled to the beverage bottle lid. The basket assembly includes a basket body that defines a chamber. One or more first openings are defined through the basket body to provide fluid communication between the chamber and the interior volume of the beverage bottle body, and one or more second openings are defined through the basket body to provide fluid communication between the chamber and the interior volume. A basket lid is coupled to the basket body. One or more third openings are defined through the basket lid and aligned with the one or more second openings to provide fluid communication between the interior volume of the beverage bottle body and the passage.

BRIEF DESCRIPTION OF THE DRAWINGS

FIG. 12 is a plan view of a lid assembly for the beverage bottle shown in FIG. 10;

FIG. 13 is a cross-sectional view of the lid assembly shown in FIG. 12 taken along sectional line B-B;

FIG. 14 is a bottom view of the lid assembly shown in FIG. 12;

DETAILED DESCRIPTION

The embodiments described herein relate to a basket assembly that is removably coupled to a lid for a beverage bottle. In one embodiment, the basket assembly is configured to contain a material, such as loose tea leaves or coffee grounds, within a chamber defined by a basket body of the basket assembly. The basket assembly allows the user to brew tea or coffee within the beverage bottle and to drink from the beverage bottle after the tea or coffee has been brewed without having to remove the basket assembly containing the used tea leaves or coffee grounds. FIGS. 1-21 illustrate various embodiments of a lid assembly including a basket assembly and a beverage bottle having such lid assemblies.

Figures 1, 2:
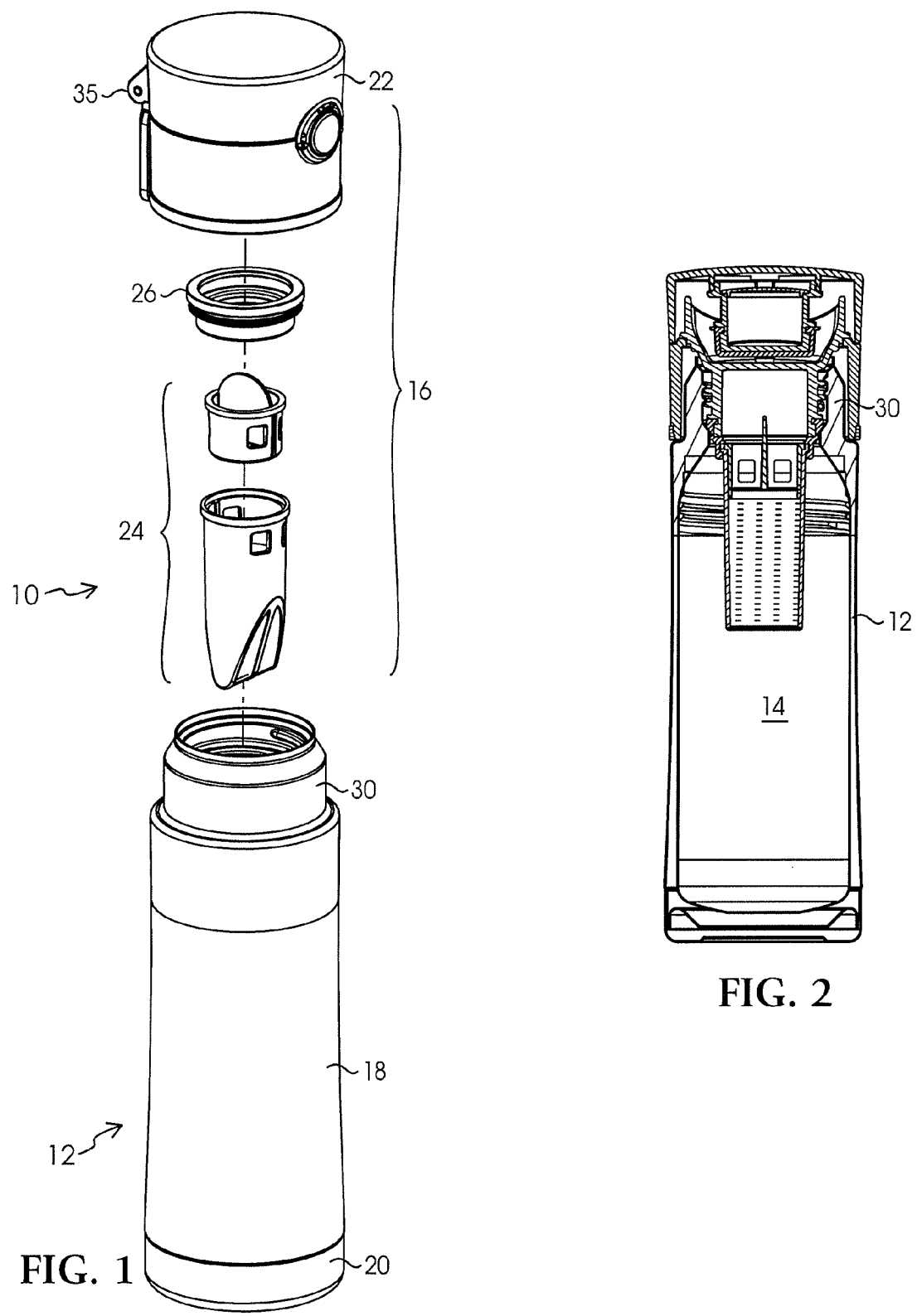
FIG. 1 is an exploded perspective view of a beverage bottle according to one embodiment described herein.
FIG. 2 is a cross-sectional view of the beverage bottle shown in FIG. 1.

Referring to FIGS. 1-9, in one embodiment a beverage bottle 10 includes a bottle body 12 defining an interior volume 14 for containing a liquid and a lid assembly 16 removably coupled to bottle body 12. FIG. 1 is an exploded perspective view of a beverage bottle 10 according to one embodiment as described herein. In this embodiment, bottle body 12 is formed of an insulated stainless steel body part 18. Bottle body 12 in a particular embodiment has a double-walled construction between which is defined an evacuated space, forming a vacuum bottle. In other embodiments, bottle body 12 is made or formed of any suitable material including, without limitation, suitable metal, composite, plastic, glass, and polymer materials, and combinations thereof. Bottle body 12 may be insulated, as shown, or un-insulated. A base 20 made of a suitable material, such as a plastic or rubber material, is coupled to a bottom portion of body part 18 to provide protection to body part 18, as well as a relatively wide surface on which beverage bottle 10 can stand. Bottle body 12 may have a smooth or contoured surface that may be provided with patterns, such as by printing, painting, embossing or other suitable processes.

Figure 3:
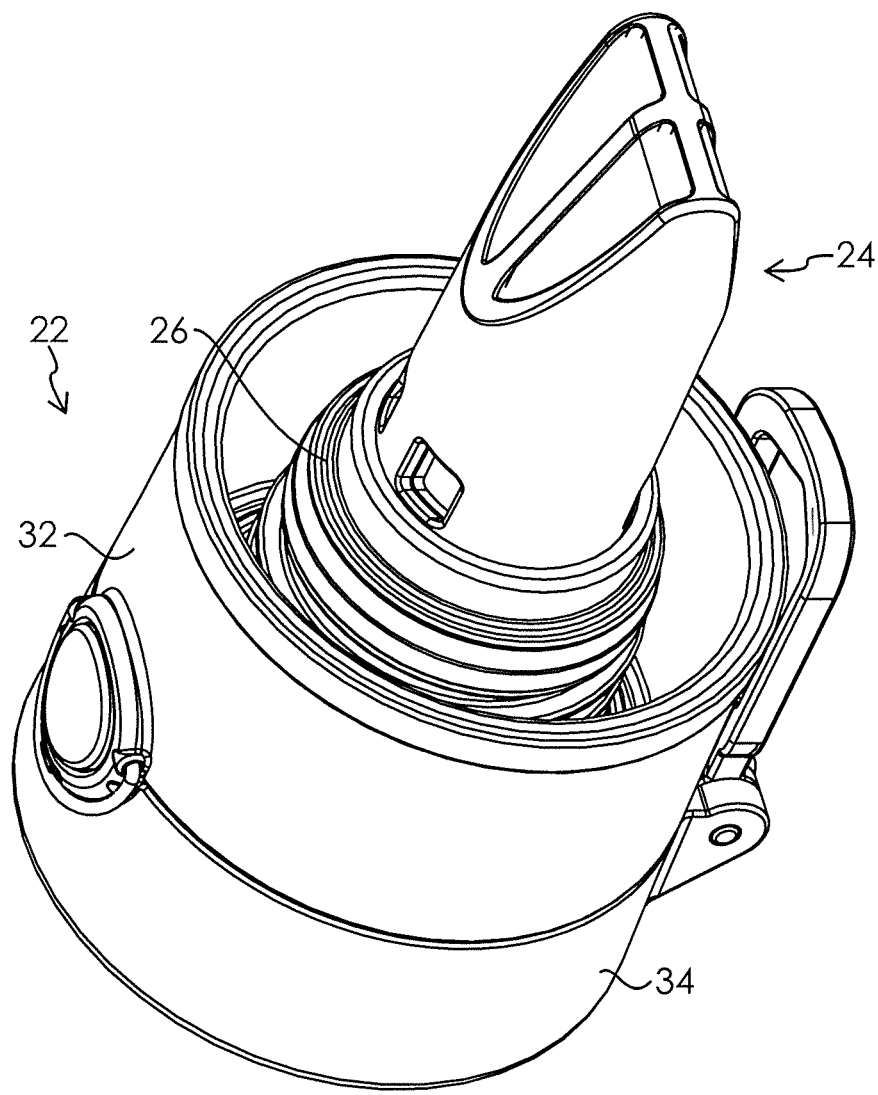
FIG. 3 is a perspective view of a lid assembly of the beverage bottle shown in FIG. 1.
Figure 4:
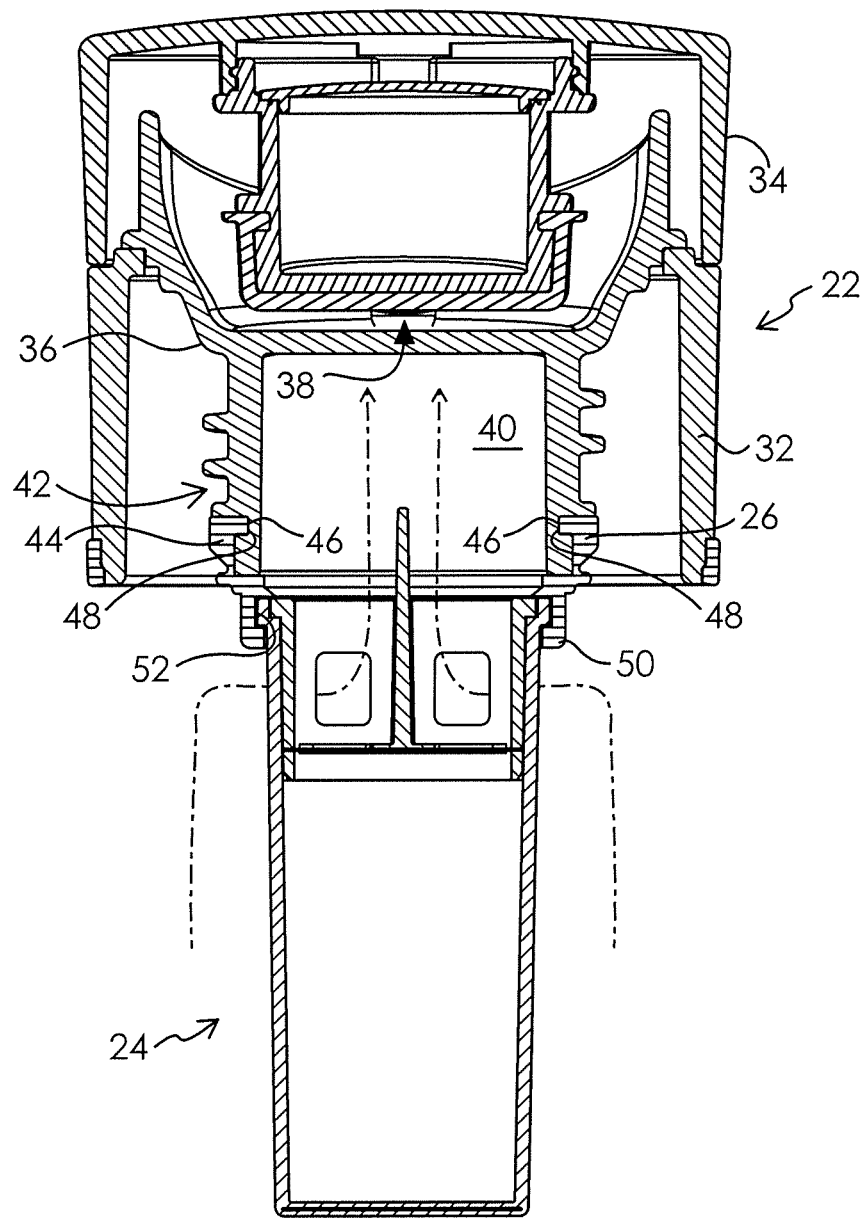
FIG. 4 is a cross-sectional view of the lid assembly shown in FIG. 3.

FIG. 2 is a cross-sectional view of beverage bottle 10 shown in FIG. 1, FIG. 3 is a perspective view of lid assembly 16 suitable for use with beverage bottle 10, and FIG. 4 is a cross-sectional view of lid assembly 16. Referring further to FIGS. 1-4, lid assembly 16 includes a beverage bottle lid 22 configured to removably couple to bottle body 12 and a basket assembly 24 coupled to bottle lid 22. In this embodiment, basket assembly 24 is removably coupled to a lid stopper gasket 26 that removably couples basket assembly 24 to bottle lid 22. As shown in FIG. 2, bottle lid 22 is secured by a threaded coupling to an upper portion of bottle body 12 forming a mouth 30, as described below.

Referring further to FIG. 4, bottle lid 22 includes a first or lower portion 32 positioned about and supported by mouth 30 of bottle body 12 and a second or upper portion 34 operably coupled to lower portion 32. In the embodiment as shown, a hinge assembly 35, shown for example in FIG. 1, pivotally couples upper portion 34 to lower portion 32. In alternative embodiments, upper portion 34 is coupled to lower portion 32 using a suitable coupling mechanism, such as cooperating threads to removably coupled upper portion 34 to lower portion 32. As shown in FIG. 4, a drink spout 36 is coupled to lower portion 32. Drink spout 36 defines a central opening 38 and a passage 40 therethrough that provide fluid communication with interior volume 14 with bottle lid 22 coupled to bottle body 12. In one embodiment, threads are formed on an inner surface of mouth 30 and cooperating threads are formed on an outer surface of drink spout 36 so that bottle lid 22 may be threadedly coupled to bottle body 12. In alternative embodiments, other suitable coupling mechanisms may be used to removably coupled bottle lid 22 to bottle body 12 including, without limitation, a snap-on lid that fits onto mouth 30, a bayonet coupling mechanism, or another suitable lid coupling structure.

Lid stopper gasket 26 is coupled to a bottom portion 42 of drink spout 36, as shown in FIG. 4. In this embodiment, at an upper portion of lid stopper gasket 26 a circumferential wall 44 forms a circumferential projection or lip 46 extending radially inward from an inner surface of circumferential wall 44. With lid stopper gasket 26 positioned about a cooperating lower portion of drink spout 36, circumferential lip 46 is positioned within a cooperating groove 48 formed in an outer surface of drink spout 36 to secure lid stopper gasket 26 to drink spout 36 and form a seal therebetween. In this embodiment, a circumferential wall 50 forms a circumferential groove 52 at a lower portion of lid stopper gasket 26. Circumferential groove 52 is configured to receive basket assembly 24 as described in greater detail below.

Figure 5:
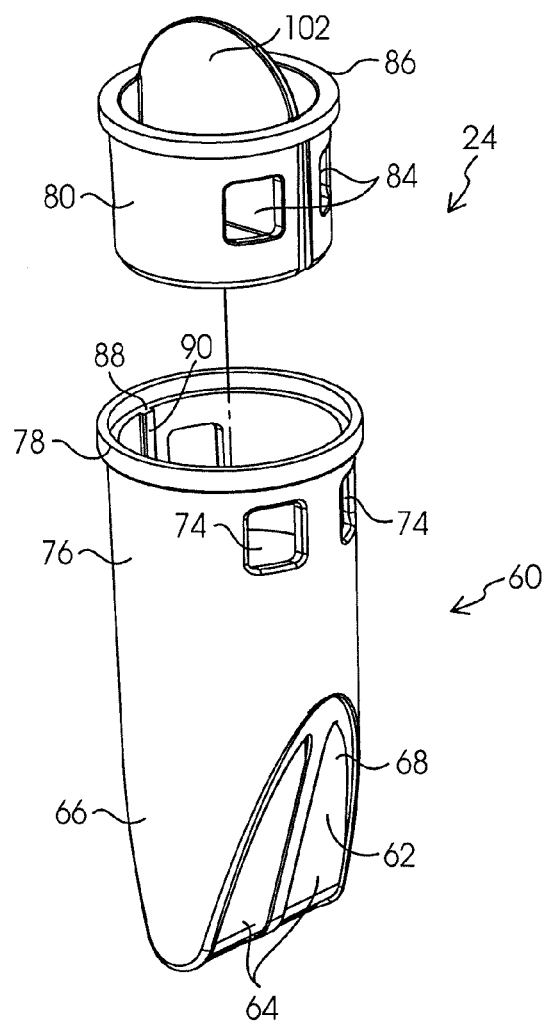
FIG. 5 is an exploded perspective view of a basket assembly of the beverage bottle shown in FIG. 1.
Figure 6:
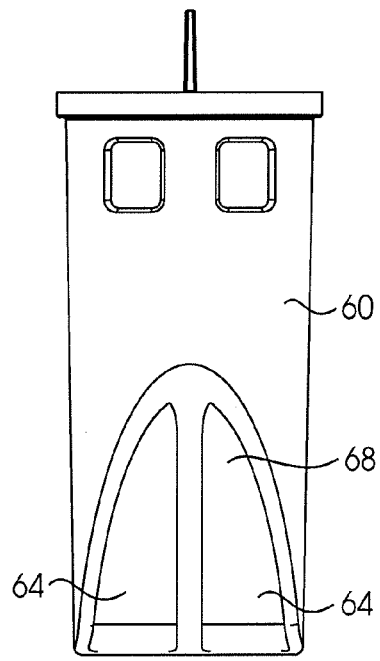
FIG. 6 is a plan view of the basket assembly shown in FIG. 5.
Figure 7:
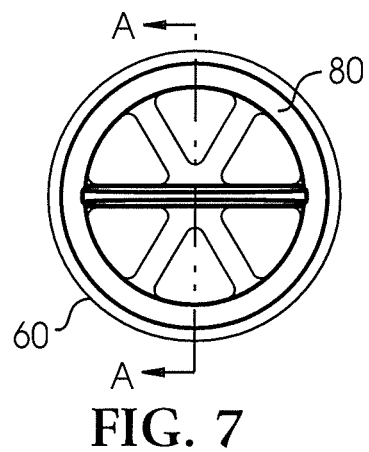
FIG. 7 is a top view of the basket assembly shown in FIG. 6.

Referring further to FIGS. 5-9, basket assembly 24 includes a basket body 60 that defines a chamber 62 configured to hold or retain a material, such as tea leaves or coffee grounds. One or more first openings 64 are defined through basket body 60 to provide fluid communication between chamber 62 and interior volume 14 of bottle body 12. First openings 64 are defined at a lower portion 66 of basket body 60. A suitable material, such as a mesh screen 68 shown in FIGS. 5 and 6, is positioned over each first opening 64 to allow liquid, such as water or brewed tea or coffee to flow through first openings 64 and to facilitate retaining material, such as tea leaves or coffee grounds, within chamber 62. Mesh screen 68 forms suitably sized openings to prevent or limit material escaping from within chamber 62 and moving into interior volume 14 of bottle body 12. One or more second openings 74 are also defined through basket body 60 to provide fluid communication between chamber 62 and interior volume 14 of bottle body 12. Second openings 74 are defined at an upper portion 76 of basket body 60. A circumferential lip 78 is formed about an outer surface of basket body 60 at upper portion 76. With basket body 60 coupled to lid stopper gasket 26, circumferential lip 78 is positioned within cooperating circumferential groove 52 of lid stopper gasket 26 to removably couple basket assembly 24 to bottle lid 22. In alternative embodiments, basket assembly 24 is threadedly coupled to or slidably coupled to drink spout 36 or lid stopper gasket 26.

Figure 8:
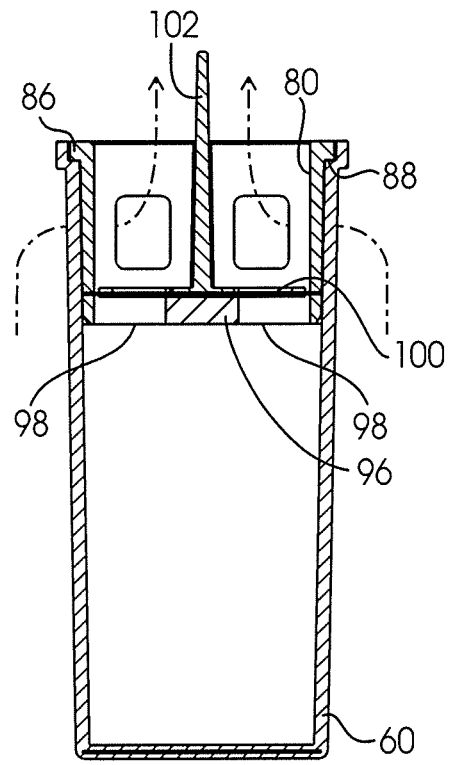
FIG. 8 is a cross-sectional view of the basket assembly shown in FIG. 7 taken along sectional line A-A.
Figure 9:
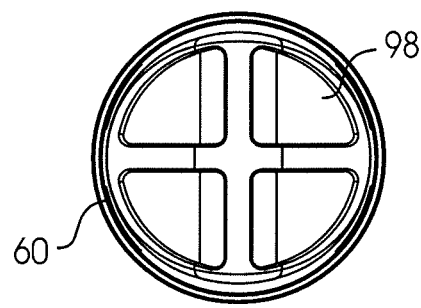
FIG. 9 is a bottom view of the basket assembly shown in FIG. 6.

Basket assembly 24 also includes a basket lid 80 that is removably coupled to basket body 60. Basket lid 80 defines one or more third openings 84 that are aligned with second openings 74 to provide fluid communication between interior volume 14 of bottle body 12 and passage 40 with basket lid 80 positioned within chamber 62 and basket assembly 24 coupled to bottle lid 22. In this embodiment, a circumferential lip 86 is formed on an outer surface of basket lid 80 that rests on a cooperating circumferential ledge or wall 88 formed on an inner surface of basket body 60, as shown in FIGS. 5 and 8, for example. In the embodiment shown in FIGS. 1-9, basket body 60 forms one or more ribs 90 extending into chamber 62, and basket lid 80 forms one or more cooperating grooves 92 configured to receive a respective rib 90 to facilitate aligning third openings 84 with cooperating second openings 74. With each rib 90 aligned within cooperating groove 92, basket lid 80 can be slidably coupled to basket body 60. In an alternative embodiment, basket lid 80 is threadedly coupled to basket body 60.

Referring to FIG. 8 for example, with basket lid 80 positioned within chamber 62, a floor 96 of basket lid 80 is positioned between first openings 64 and second opening 74 to prevent or limit material escaping from within chamber 62 directly into passage 40. In this embodiment, floor 96 includes one or more vent openings 98 defined therethrough with a mesh screen 100, positioned over each vent opening 98 to facilitate retaining the tea leaves or coffee grounds within chamber 62. In this embodiment, mesh screen 100 is coupled to a surface of floor 96 below third openings 84 to allow liquid, such as water or brewed tea or coffee, to flow through vent openings 98 but prevent or limit material, such as tea leaves or coffee grounds, escaping from within chamber 62 and moving into passage 40. Basket lid 80 further includes a fin 102 coupled to floor 96 and extending outwardly from basket lid 80 such that the user can grasp fin 102 to facilitate removing basket lid 80 from basket body 60, as desired, to remove used tea leaves or coffee grounds and/or to add new tea leaves or coffee grounds.

To brew tea, for example, in beverage bottle 10, the user introduces a suitable amount of water having a desired temperature into interior volume 14. An appropriate amount tea leaves is placed in chamber 62 of basket body 60, and basket lid 80 is slidably coupled to basket body 60 to retain the tea leaves within chamber 62. Basket body 60 is then coupled to lid stopper gasket 26 which is coupled to drink spout 36, as described herein, to couple basket assembly 24 to bottle lid 22. Bottle lid 22 is positioned on mouth 30 to couple bottle lid 22 to bottle body 12. With bottle lid 22 properly coupled to bottle body 12, the tea is brewed. The first openings 64 formed through basket body 60 provides fluid communication between interior volume 14 and chamber 62 to allow the tea to steep as the heated water enters chamber 62.

Referring again to FIG. 3, with beverage bottle 10 assembled and upper portion 34 of bottle lid 22 removed from lower portion 32 of bottle lid 22, as the user tilts beverage bottle 10, the brewed tea exits interior volume 14 through second openings 74 and aligned third openings 84, into passage 40 and through central opening 38, as shown by the directional arrows in FIG. 3, such that the user is able to drink the tea from drink spout 36. Unlike conventional beverage bottles, because basket lid 80 is positioned within chamber 62 and prevents the tea leaves from exiting chamber 62 into passage 40, the user is able to drink the tea from interior volume 14 without having to remove basket assembly 24 from bottle lid 22.

Figures 10, 11:
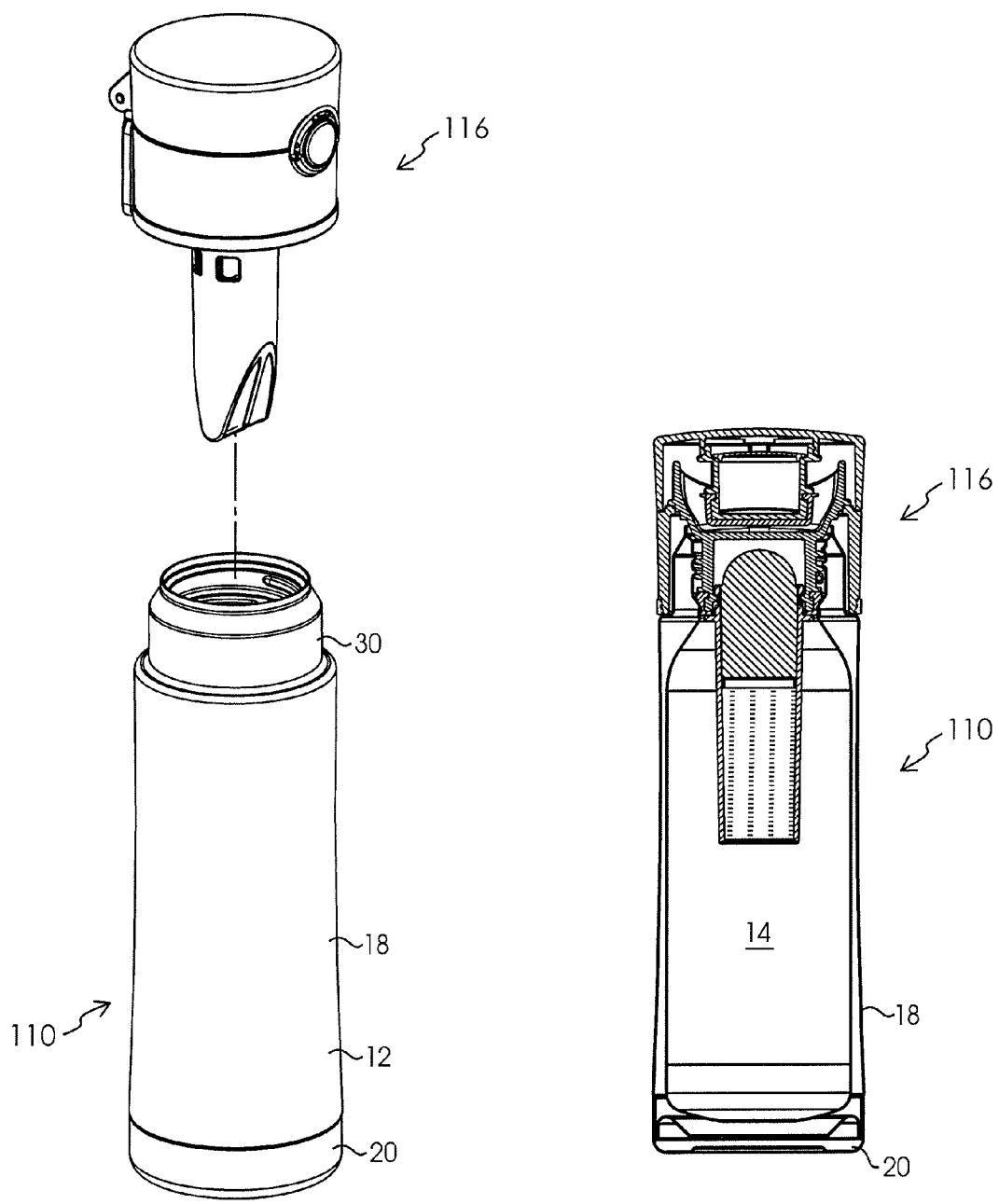
FIG. 10 is an exploded perspective view of a beverage bottle according to one embodiment described herein.
FIG. 11 is a cross-sectional view of the beverage bottle shown in FIG. 10.

FIGS. 10-21 illustrate one embodiment of a beverage bottle 110 including a basket assembly that is removably coupled to a bottle lid with a bayonet-style coupling mechanism. Element reference numbers used with reference to FIGS. 1-9 are used herein to refer to similar elements indicated in FIGS. 10-21. Referring further to FIGS. 10-21, in one embodiment beverage bottle 110 includes a bottle body 12 defining an interior volume 14 for containing a liquid and a lid assembly 116 removably coupled to bottle body 12. FIG. 10 is an exploded perspective view of beverage bottle 110 according to one embodiment as described herein. In this embodiment, bottle body 12 is formed of an insulated stainless steel body part 18. Bottle body 12 in a particular embodiment has a double-walled construction between which is defined an evacuated space, forming a vacuum bottle. In other embodiments, bottle body 12 is made or formed of any suitable material including, without limitation, suitable metal, composite, plastic, glass, and polymer materials, and combinations thereof. Bottle body 12 may be insulated, as shown, or un-insulated. Base 20 made of a suitable material, such as a plastic or rubber material, is coupled to a bottom portion of body part 18 to provide protection to body part 18, as well as a relatively wide surface on which beverage bottle 10 can stand. Bottle body 12 may have a smooth or contoured surface that may be provided with patterns, such as by printing, painting, embossing or other suitable processes.

Figure 15:
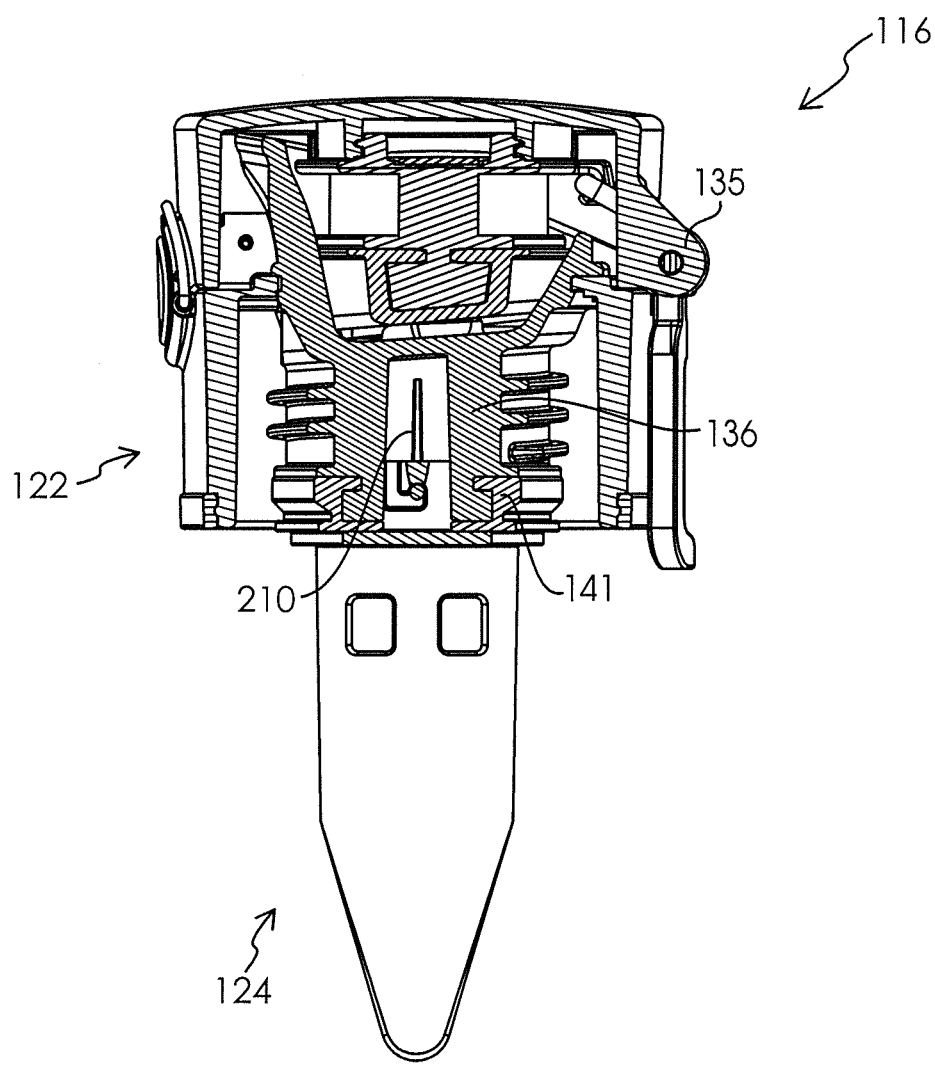
FIG. 15 is a sectional view of the lid assembly shown in FIG. 14 taken along sectional line C-C.

FIG. 11 is a cross-sectional view of beverage bottle 110 shown in FIG. 10, FIG. 12 is a plan view of a lid assembly 116 suitable for use with beverage bottle 110 shown in FIG. 10, FIG. 13 is a cross-sectional view of lid assembly 116 shown in FIG. 12, FIG. 14 is a bottom view of lid assembly 116, and FIG. 15 is a sectional view of lid assembly 116. Referring further to FIGS. 10-15, lid assembly 116 includes a beverage bottle lid 122 configured to removably couple to bottle body 12 and a basket assembly 124 coupled to bottle lid 122. In this embodiment, basket assembly 124 is removably coupled to bottle lid 122 with a bayonet-style coupling mechanism, as described in greater detail below with further reference to FIGS. 16-21. As shown in FIG. 11, bottle lid 122 is secured by a threaded coupling to an upper portion of bottle body 12 forming mouth 30.

Referring further to FIGS. 13 and 15, bottle lid 122 includes a first or lower portion 132 positioned about and supported by mouth 30 of bottle body 12 and a second or upper portion 134 operably coupled to lower portion 132. In the embodiment as shown, a hinge assembly 135, shown for example in FIGS. 13 and 15, pivotally couples upper portion 134 to lower portion 132. In alternative embodiments, upper portion 134 is coupled to lower portion 132 using a suitable coupling mechanism, such as cooperating threads to removably coupled upper portion 134 to lower portion 132. As shown in FIGS. 13 and 15, a drink spout 136 is coupled to lower portion 132. Drink spout 136 defines a central opening 138 and a passage 140 therethrough that provide fluid communication with interior volume 14 with bottle lid 122 coupled to bottle body 12, as described in greater detail herein. Threads are formed on an inner surface of mouth 30 and cooperating threads are formed on an outer surface of drink spout 136 so that bottle lid 122 may be threadedly coupled to bottle body 12. In alternative embodiments, other suitable coupling mechanisms may be used to removably coupled bottle lid 122 to bottle body 12 including, without limitation, a snap-on lid that fits onto mouth 30, a bayonet coupling mechanism, or another suitable lid coupling structure.

A lid stopper gasket 141 is coupled to a bottom portion 142 of drink spout 136, as shown in FIGS. 13 and 15. In this embodiment, at an upper portion of lid stopper gasket 141 a circumferential wall 144 forms a circumferential projection or lip 146 extending inwardly from an inner surface of circumferential wall 144. With lid stopper gasket 141 positioned about a cooperating lower portion of drink spout 136, circumferential lip 146 is positioned within a cooperating groove 148 formed in an outer surface of drink spout 136 to secure lid stopper gasket 141 to drink spout 136 and form a seal therebetween.

Figure 16:
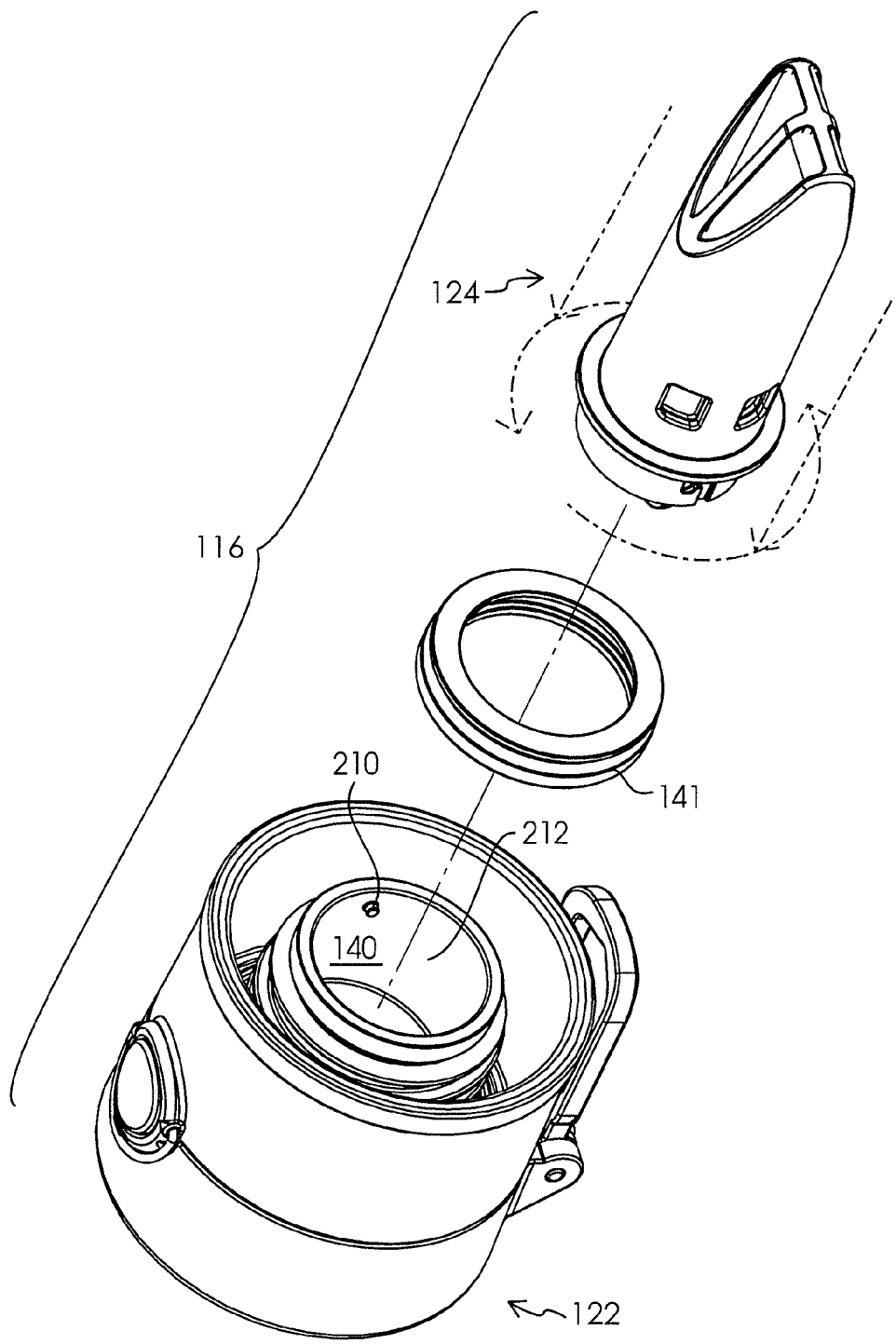
FIG. 16 is an exploded perspective view of the lid assembly shown in FIG. 12.
Figure 17:
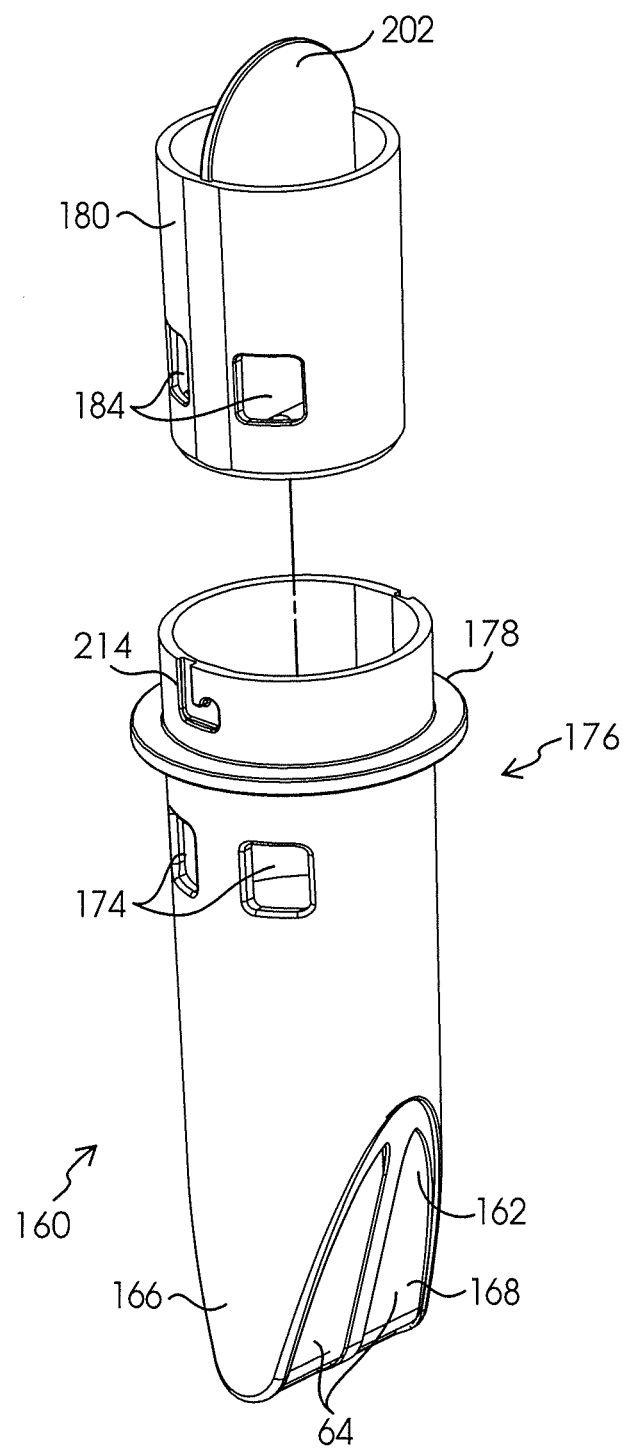
FIG. 17 is an exploded perspective view of a basket assembly of the beverage bottle shown in FIG. 10.
Figure 18:
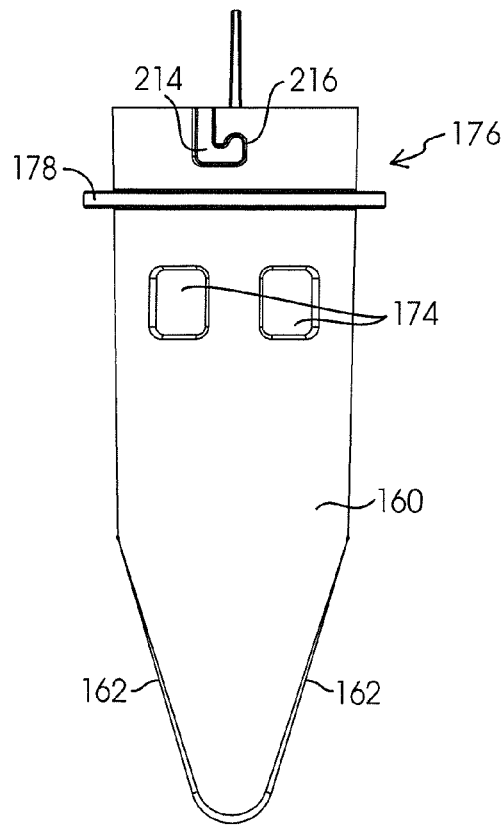
FIG. 18 is a plan view of the basket assembly shown in FIG. 17.
Figure 19:
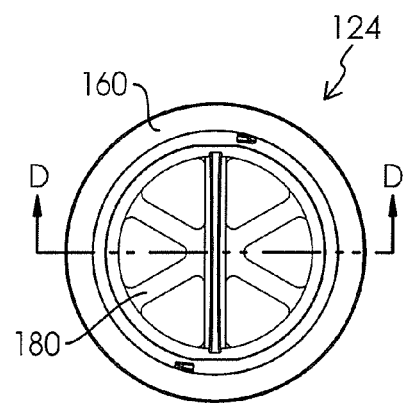
FIG. 19 is a top view of the basket assembly shown in FIG. 18.
Figure 20:
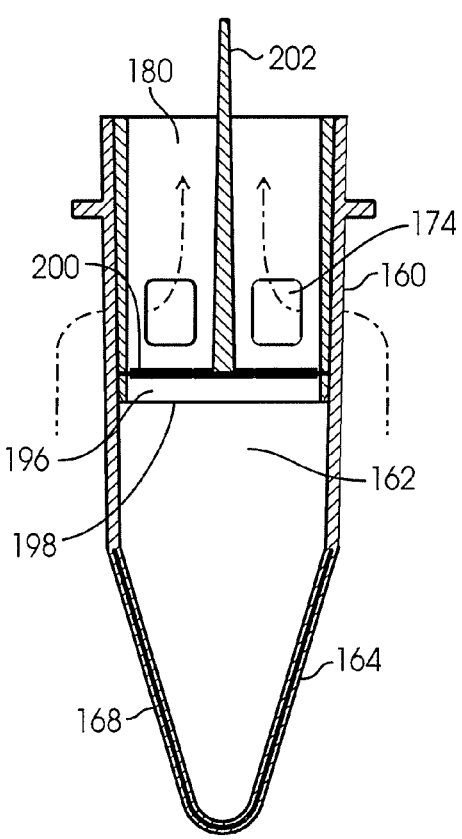
FIG. 20 is a cross-sectional view of the basket assembly shown in FIG. 19 taken along sectional line D-D.
Figure 21:
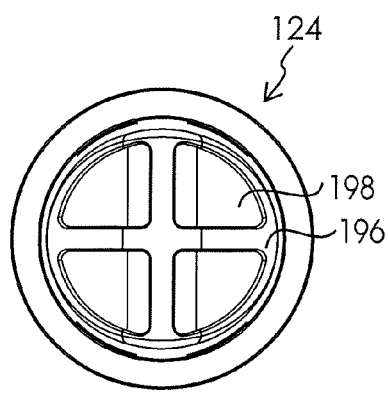
FIG. 21 is a bottom view of the basket assembly shown in FIG. 18.

Referring further to FIGS. 16-21, basket assembly 124 includes a basket body 160 that defines a chamber 162 configured to hold or retain a material, such as tea leaves or coffee grounds. One or more first openings 164 are defined through basket body 160 to provide fluid communication between chamber 162 and interior volume 14 of bottle body 12. First openings 164 are defined at a lower portion 166 of basket body 160. A suitable material, such as a mesh screen 168 shown in FIGS. 18 and 20, is positioned over each first opening 164 to allow liquid, such as water or brewed tea or coffee to flow through first openings 164 and to facilitate retaining material, such as tea leaves or coffee grounds, within chamber 162. Mesh screen 168 forms suitably sized openings to prevent or limit material escaping from within chamber 162 and moving into interior volume 14 of bottle body 12. One or more second openings 174 are also defined through basket body 160 to provide fluid communication between chamber 162 and interior volume 14 of bottle body 12. Second openings 174 are defined at an upper portion 176 of basket body 160. A circumferential lip 178 is formed about an outer surface of basket body 160 at upper portion 176. With basket body 160 coupled to drink spout 136, as described herein, circumferential lip 178 is positioned against lid stopper gasket 141 to removably secure basket assembly 124 to bottle lid 122 and form a seal between basket body 160 and lid stopper gasket 141.

Basket assembly 124 also includes a basket lid 180 that is removably coupled to basket body 160. Basket lid 180 defines one or more third openings 184 that are aligned with second openings 174 to provide fluid communication between interior volume 14 of bottle body 12 and passage 140 with basket lid 180 positioned within chamber 162 and basket assembly 124 coupled to bottle lid 122. In this embodiment, basket lid 180 is slidably positionable within chamber 162 to align third openings 184 with cooperating second openings 174.

As shown in FIG. 20, with basket lid 180 positioned within chamber 162, a floor 196 of basket lid 180 is positioned between first openings 164 and second opening 174 to prevent or limit material escaping from within chamber 162 directly into passage 140. In this embodiment, floor 196 includes one or more vent openings 198 defined therethrough with a mesh screen 200, positioned over each vent opening 198 to facilitate retaining tea leaves or coffee grounds, for example, within chamber 162. In this embodiment, mesh screen 200 is coupled to a surface of floor 196 below third openings 184 to allow liquid, such as water or brewed tea or coffee, to flow through vent openings 198 but prevent or limit material, such as tea leaves or coffee grounds, escaping from within chamber 162 and moving into passage 140. Basket lid 180 further includes a fin 202 coupled to the bottom surface of basket lid 180 and extending outwardly from basket lid 180 such that the user can grasp fin 202 to facilitate removing basket lid 180 from basket body 160, as desired, to remove used tea leaves or coffee grounds and/or to add new tea leaves or coffee grounds.

Referring again to FIGS. 13, and 16-18, for example, basket body 160 is removably coupled to lower portion 142 of drink spout 136 with a bayonet-style coupling mechanism. In this embodiment, one or more projections, such as pins 210, are formed on an inner surface 212 of drink spout 136 to extend radially into passage 140. Referring further to FIGS. 13 and 16, two opposing pins 210 are formed on inner surface 212 and extend radially into passage 140 in a particular embodiment. Cooperating bayonet grooves 214, as shown in FIGS. 17 and 18, are defined in upper portion 176 of basket body 160 above circumferential lip 178. As shown in FIG. 18, for example, each bayonet groove 214 defines a locking feature 216 within which pin 210 is positionable to couple basket body 160 to drink spout 136. With basket lid 180 positioned within basket body 160, upper portion 176 of basket body 160 is inserted into passage 140 such that each pin 210 is inserted into corresponding bayonet groove 214. With each pin 210 properly positioned within corresponding bayonet groove 214, basket body 160 is rotated with a twisting motion with respect to bottle lid 122 to position each pin 210 in a locking position within a respective locking feature 216 to facilitate coupling basket assembly 124 to bottle lid 122. A compressive force between lid stopper gasket 141 and basket body 160 and between lid stopper gasket 141 and bottom portion 142 of drink spout 136 facilitates retaining basket assembly 124 in a locked position as well as forming a seal to prevent liquid leakage at the coupling.

To brew tea, for example, in beverage bottle 110, the user introduces a suitable amount of water having a desired temperature into interior volume 14. An appropriate amount tea leaves is placed in chamber 162 of basket body 160, and basket lid 180 is coupled to basket body 160 to retain the tea leaves within chamber 162. Basket body 160 is then coupled to drink spout 36, as described herein, to couple basket assembly 124 to bottle lid 122. More specifically, each pin 210 formed on the inner surface of drink spout 136 is inserted into a corresponding bayonet groove 214 formed in basket body 160. With each pin 210 properly positioned within corresponding bayonet groove 214, basket body 160 is rotated with a twisting motion with respect to bottle lid 122 to position each pin 210 in a locking position within a respective locking feature 216 of bayonet groove 214 to couple basket assembly 124 to bottle lid 122. Bottle lid 122 is positioned on mouth 30 of bottle body 12 to couple bottle lid 122 to bottle body 12. With bottle lid 122 properly coupled to bottle body 12, the tea is brewed. The first openings 164 formed through basket body 160 provides fluid communication between interior volume 14 and chamber 162 to allow the tea to steep as the heated water enters chamber 162.

Referring to FIG. 13, with beverage bottle 110 assembled and upper portion 134 of bottle lid 122 removed from lower portion 132 of bottle lid 122, as the user tilts beverage bottle 110, the brewed tea exits interior volume 14 through second openings 174 and aligned third openings 184, into passage 140 and through central opening 138, as shown by the directional arrows in FIG. 13, such that the user is able to drink the tea from drink spout 136.

The described assemblies and methods are not limited to the specific embodiments described herein. In addition, components of each assembly and/or steps of each method may be practiced independent and separate from other components and method steps, respectively, described herein. Each component and method also can be used in combination with other systems, assemblies, and methods.

This written description uses examples to disclose the embodiments, including the best mode, and also to enable any person skilled in the art to practice the embodiments, including making and using any devices or assemblies and performing any incorporated methods. The patentable scope of the embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A lid assembly for a beverage bottle, comprising:
   a beverage bottle lid configured to removably couple to a beverage bottle body defining an interior volume, the beverage bottle lid comprising a drink spout defining a passage; and
   a basket assembly removably coupled to the beverage bottle lid, the basket assembly comprising:
   a basket body defining a chamber having an open upper portion, one or more first openings defined through a wall of the basket body for providing fluid communication between the chamber and the interior volume of the beverage bottle body, and one or more second openings defined through the wall of the basket body, the one or more second openings being located between the one or more first openings and the open upper portion; and
   a basket lid coupled to the basket body and covering at least a portion of the open upper portion, the basket lid having a floor, a side wall extending from the floor, and an open end opposite the floor, the side wall defining one or more third openings therethrough, the one or more third openings being aligned with the one or more second openings in the basket body so as to provide fluid communication from the interior volume of the beverage bottle body, through the aligned second and third openings, through the open end of the basket lid, and out the passage;
   wherein the drink spout forms one or more pins on an inner surface of the drink spout that extend into the passage and the basket body defines one or more bayonet grooves each configured to receive a corresponding pin of the one or more pins.

2. The lid assembly of claim 1 wherein each of the one or more bayonet grooves comprises a locking feature configured to lock the corresponding pin in the bayonet groove.

3. The lid assembly of claim 1 further comprising a lid stopper gasket positioned between the drink spout and the basket body.

4. A basket assembly for removably coupling to a lid of a beverage bottle, the beverage bottle having a body defining an interior volume, the basket assembly comprising:
- a basket body defining an open ended chamber having an open upper portion, one or more first openings defined through a wall of the basket body at a lower portion thereof for providing fluid communication between the chamber and the interior volume of the beverage bottle body when the lid is coupled to the beverage bottle body, and one or more second openings defined through the wall of the basket body, the one or more second openings being located between the first openings at the lower portion of the chamber and the open upper portion of the chamber, the one or more first openings being configured to retain material substantially within the chamber of the basket body while permitting liquid in the beverage bottle to contact the material within the chamber of the basket body; and
- a basket lid configured to be coupled to the basket body within the chamber and defining a fully seated position within the chamber, the basket lid defining one or more third openings, the basket lid having a floor positioned between the one or more first openings and the one or more second openings within the chamber when the basket lid is located in the fully seated position, the floor of the basket lid separating the chamber into an open upper chamber and a closed lower chamber, the floor of the basket lid being configured to retain the material substantially within the chamber of the basket body when the beverage bottle is oriented to dispense a liquid from the interior volume of the beverage bottle body through the aligned second and third openings and through the open upper chamber,
wherein the one or more second openings provides direct fluid communication from the interior volume of the beverage bottle body, through the one or more second openings, into the open upper chamber, and out a passage formed through the beverage bottle lid.

5. The basket assembly of claim 4 further comprising a mesh screen covering the one or more first openings to facilitate retaining material within the chamber.

6. The basket assembly of claim 4 further comprising a mesh screen coupled to a bottom surface of the basket lid below the one or more third openings to facilitate retaining material within the chamber.

7. The basket assembly of claim 4 further comprising a lid stopper gasket configured to removably couple the basket assembly to the beverage bottle lid.

8. The basket assembly of claim 4 wherein the beverage bottle lid comprises a drink spout having one or more pins extending from an inner surface of the drink spout, and wherein the basket body defines one or more bayonet grooves configured to receive a corresponding pin to facilitate coupling the basket assembly to the basket bottle lid.

9. The basket assembly of claim 4 wherein the basket lid is slidably coupled to the basket body.

10. The basket assembly of claim 9 wherein the basket body forms a rib extending into the chamber, and the basket lid forms a cooperating groove configured to receive the rib to facilitate aligning the one or more third openings with the one or more second openings.

11. The basket assembly of claim 4 wherein the basket assembly is threadedly coupled to the beverage bottle lid.

12. The basket assembly of claim 4 wherein the basket body forms a circumferential lip configured to couple to the beverage bottle lid.

13. The basket assembly of claim 4 wherein the basket lid further comprises a fin extending outwardly from a surface of the basket lid to facilitate positioning the basket lid within the basket body.

14. The basket assembly of claim 4 wherein the lower portion of the basket body has a tapered shape.

15. The lid assembly of claim 1 wherein the basket lid further comprises a fin coupled to the floor of the basket lid and extending outwardly from the basket lid to facilitate positioning the basket lid within the basket body.

16. The lid assembly of claim 1 wherein the lower portion of the basket body has a tapered shape.

17. The lid assembly of claim 1 wherein the beverage bottle lid includes a
first portion and a second portion hinged to lower portion.

* * * * *